Feb. 11, 1930. A. J. HEMMER 1,746,772
NONSKIDDING DEVICE
Filed May 11, 1929
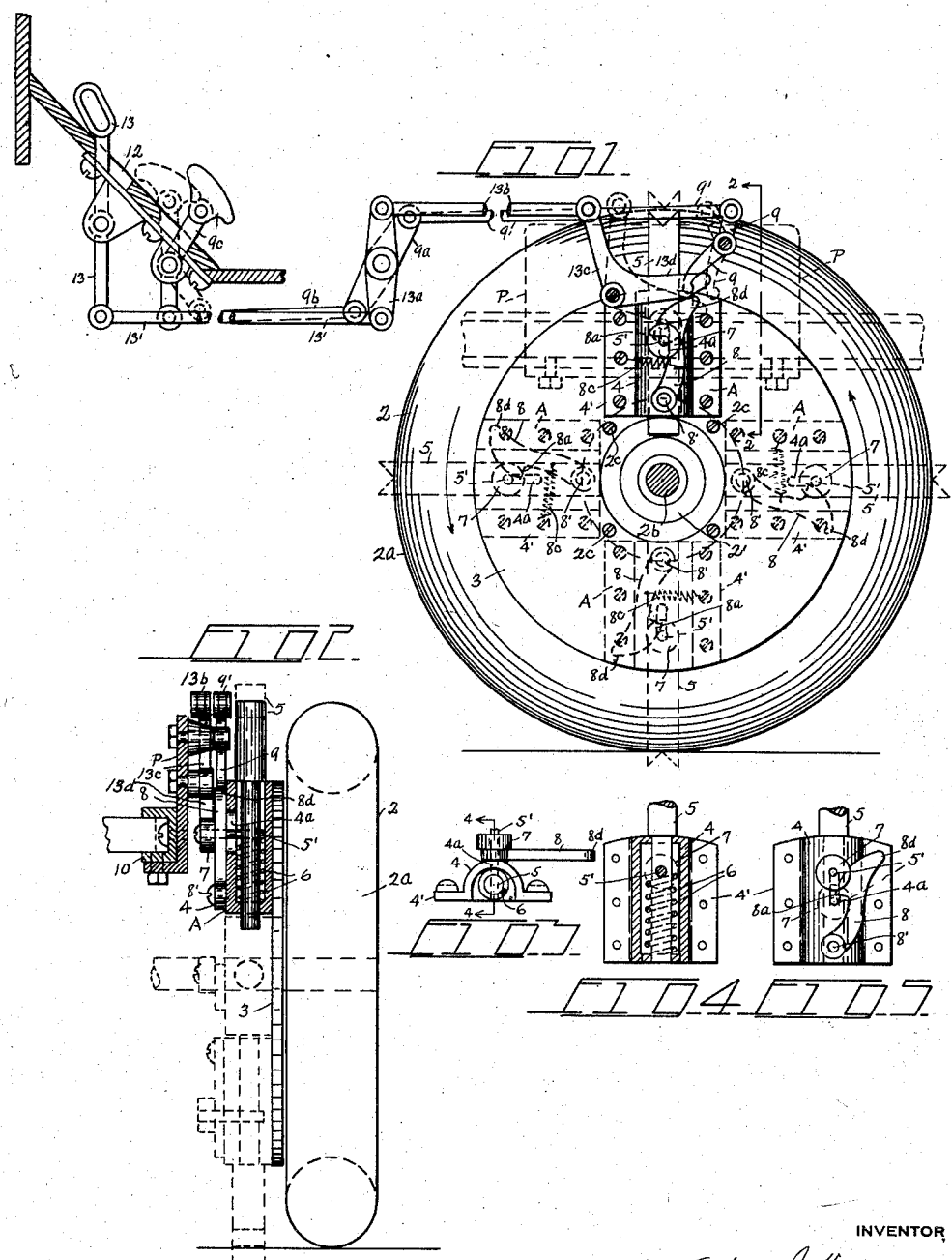

Patented Feb. 11, 1930

1,746,772

UNITED STATES PATENT OFFICE

ALFRED J. HEMMER, OF SYRACUSE, NEW YORK

NONSKIDDING DEVICE

Application filed May 11, 1929. Serial No. 362,423.

This invention relates to an anti-skidding device, designed particularly for automobile trucks, whose oversized tires are unsuited for the ordinary chains.

An object of the invention is to provide a plural arrangement of similar anti-skidding units which are arranged permanently at regularly spaced intervals, upon the inner faces of the wheels of a truck, said units being secured to a common support, which may be made rigid with the rim or the hub of the wheel, or with both of said parts. Each unit comprises a reciprocable rod or bolt having its outer end formed with points or barbs that are adapted to bite into the surface of a roadway to prevent lateral skidding of the wheel, said rods being moved towards the operative position by strong compression means, the latter adapted to yield under the weight of the truck, but offering sufficiently powerful resistance to effectively prevent skidding during and after such yielding until the rods are restored to and locked in their inoperative positions, said rods being restrained from operation by individual locking means, which may be controlled from the driver's position, and said locking parts being operated by releasing means also located within convenient reach of the driver. The several traction bolts carried by each wheel are arranged to be released in sequence during a full revolution of the wheel, the said bolts also being withdrawn and locked in the idle or inoperative position, in the same sequential manner during a revolution of a wheel.

A further object is to provide novel bolt releasing and locking means that are preferably mounted upon a panel or support which is preferably rigid with the chassis of the truck, and so positioned as not to interfere with nor be disturbed by the loading, unloading or the operation of the truck.

I attain these objects by the means set forth in the detailed description which follows, these means being illustrated by the accompanying drawing, in which—

Figure 1 is an inner side elevation of a truck wheel, to which my improvement is applied, and a broken view of certain parts of the vehicle. Fig. 2 is an edge view of the wheel, and a broken sectional view of a portion of the chassis that supports the locking and releasing mechanisms. Fig. 3 is an end elevation of one of the housings for the traction bolts, showing the releasing lever; also showing the means for rendering the bolt inoperative. Fig. 4 is a central vertical section, taken on line 4—4 of Fig. 3, showing the compression means for shooting the bolt towards the operative position. And Fig. 5 is a top plan view of the housing shown in Figs. 1, 2 and 3.

In the drawing, 2 represents one of the rear wheels of an auto-truck, for example the right rear wheel, which includes the hub 2', the tire $2^a$, and the rear axle $2^b$. 3 represents a relatively large disc or annular plate preferably consisting of heavy gage sheet steel, which may be secured to the inner face of the wheel rim or to the hub 2', by bolts $2^c$ (see Fig. 1). The parts of my anti-skidding mechanism that are carried by and movable with the wheel 2 are mounted upon the disc 3, and comprise a number of similar units indicated at A, in Figs. 1 and 2. Each unit consists of a semi-cylindrical housing 4, which is formed with lateral perforated flanges 4', that may be bolted to the plate 3, as shown. The body is hollow throughout its length and is so positioned on the plate 3 that its axis is radial. Within the body 4 is loosely disposed one end of a traction bolt or rod 5, the other end of the bolt being extended substantially to the plane of the periphery or tread of the tire, as when the bolt is in the inoperative position, shown by the full lines in Figs. 1 and 2. The enclosed portion of the bolt is bored diametrically to receive a pin 5', which plays in a slot $4^a$ formed in the outer wall of the body 4, so as to enable the bolt to be moved radially beyond the plane of the tread of the tire, to prevent lateral skidding of the wheel. The bolt 5 is moved outwardly by the compression of a stout coil spring 6, which is mounted on the bolt within the casing 4, and is in constant engagement with the pin 5', as shown in Figs. 2 and 4. A roller 7 journalled on the projecting end of the pin 5', when acted upon by means controlled by the driver of the vehicle, moves the bolt 5 towards the axle 2ᵇ, and breaks the contacts of the barbed outer end with the roadway. The bolt 5 is locked in the inoperative position (see Fig. 1) by a latch 8, which is pivoted to the inner end of the casing 4, by a bolt 8′, and is formed with a medial hook-tooth 8ᵃ, which faces and is adapted to engage the pin 5′ when the bolt is moved towards the axis of the wheel, and for this purpose, the latch 8 is tensioned by a spring 8ᶜ, which normally holds the latch in engagement with pin 5′, whether the bolt is in the operative or inoperative position. Beyond the tooth 8ᵃ the latch curves away from the axis of the bolt 5 and terminates in a point 8ᵈ, and when the latch is in the locking position (see Fig. 1), the said point, when the wheel revolves, crosses the path of a rocking lever or dog 9, which is pivoted to a panel or plate P, carried by the adjacent member or rail 10 of the chassis, as shown in Fig. 2. The lever or trip 9 is operated by a train of parts including a rod 9′, a lever 9ᵃ, a second rod 9ᵇ, and a pedal 9ᶜ which is pivoted to the inclined portion 12 of the deck of the truck, within reach of the driver's feet (see Fig. 1). The depressing of the pedal causes the free end of the lever 9 to intercept and swing the latches 8 in the direction for disengaging teeth 8ᵃ from the pins 5′, for effecting the release of the several bolts, at the will of the operator, whenever there is imminent danger of the truck skidding. By providing the pedal 9ᶜ for releasing the several traction bolts, the driver may quickly free the bolts with his foot and also have the free use of his hands for steering or other activities. When the danger of skidding is past, the driver of the truck may shift all of the bolts inwardly to the inoperative position, by simply pulling on a hand-lever 13, which is also pivoted to the deck 12, and then holding said lever rigid until the wheel has made a full revolution. This pulling on the lever 13 operates a rod 13′, a rocking lever 13ᵃ, another rod 13ᵇ, and a bell-crank 13ᶜ, the latter being pivoted to the panel P. The bell-crank 13ᶜ is formed with an arm 13ᵈ, which is normally positioned directly above and clear of the path of the rollers 7 (see Fig. 1). The rocking of the bell-crank in the right direction depresses the rollers 7, and moves the bolts 5 inwardly against the tension of springs 6, until the teeth 8ᵃ again engage the pins 5′, for holding the bolts in the locked position, as described.

Having thus described my invention, what I claim, is—

1. The combination with a vehicle wheel, of a plurality of traction bolts mounted upon one face of the wheel for radial movement towards and from the plane of the tread of the wheel, compression means to move the bolts towards the operative position, latches for holding the bolts inoperative, and means controlled by the driver for withdrawing the bolts from the tractive position, for enabling the latches to lock the bolts in the inoperative position.

2. In an anti-skidding device, the combination with a vehicle wheel, of a plurality of traction members mounted radially on one face of the wheel and movable towards and from the plane of the tread of the wheel, common means rigid with the wheel to support all of said members, compression means to move the members towards the tractive position, means to hold said members clear of the roadway, means to trip the series of holding means sequentially to enable said compression means to operate said members, and means for sequentially moving said members radially towards the axle of the wheel when the danger of skidding is past.

3. In a non-skidding device, a plurality of non-skid members mounted for reciprocation upon one face of a vehicle wheel and movable radially, latches for holding said members in the inoperative positions, means operable from the driver's position for releasing said latches to prevent skidding of the wheel, compression means to move the members when the latches are tripped, and a bell-crank adapted to sequentially move all of said members back to the inoperative positions.

In testimony whereof I affix my signature.

ALFRED J. HEMMER.